June 17, 1952  E. B. ATKINSON  2,600,722
MEASURING FISH WIRE REEL
Filed Sept. 22, 1949  2 SHEETS—SHEET 2
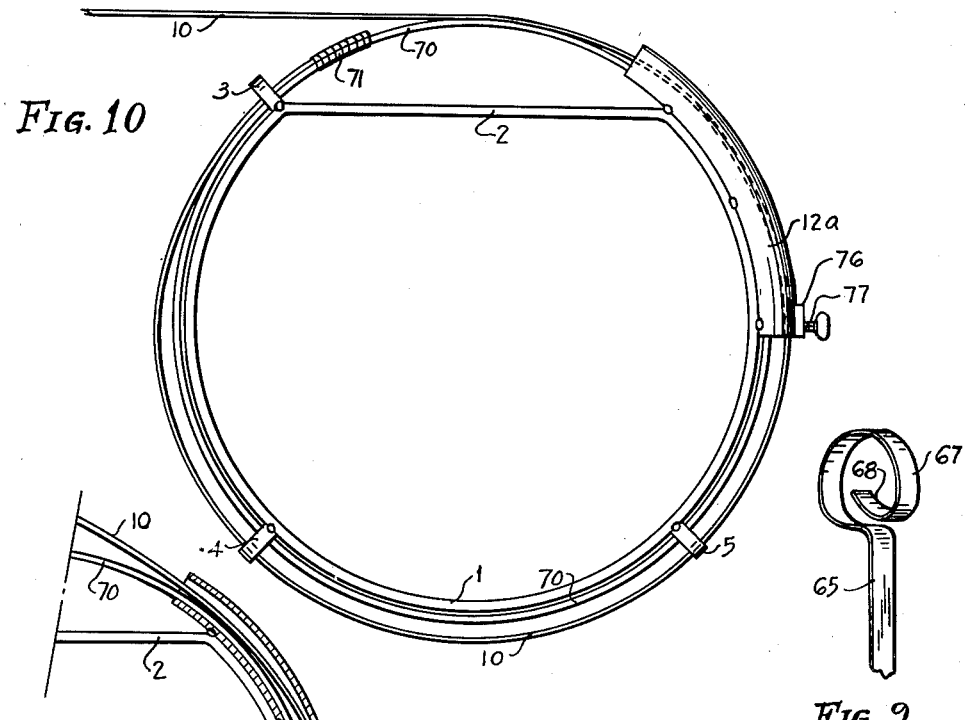
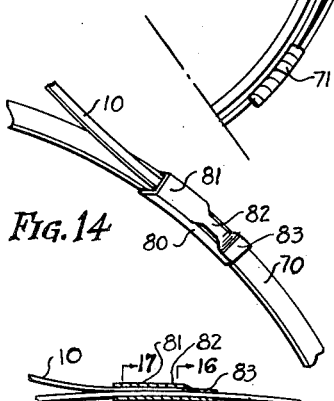
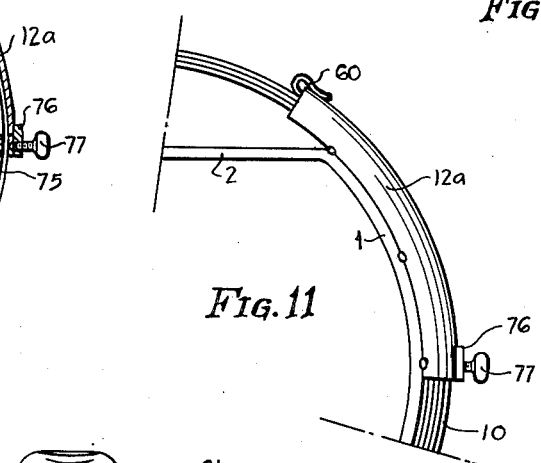
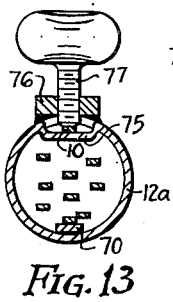
INVENTOR.
EARL B. ATKINSON
BY
ATTY Patented June 17, 1952

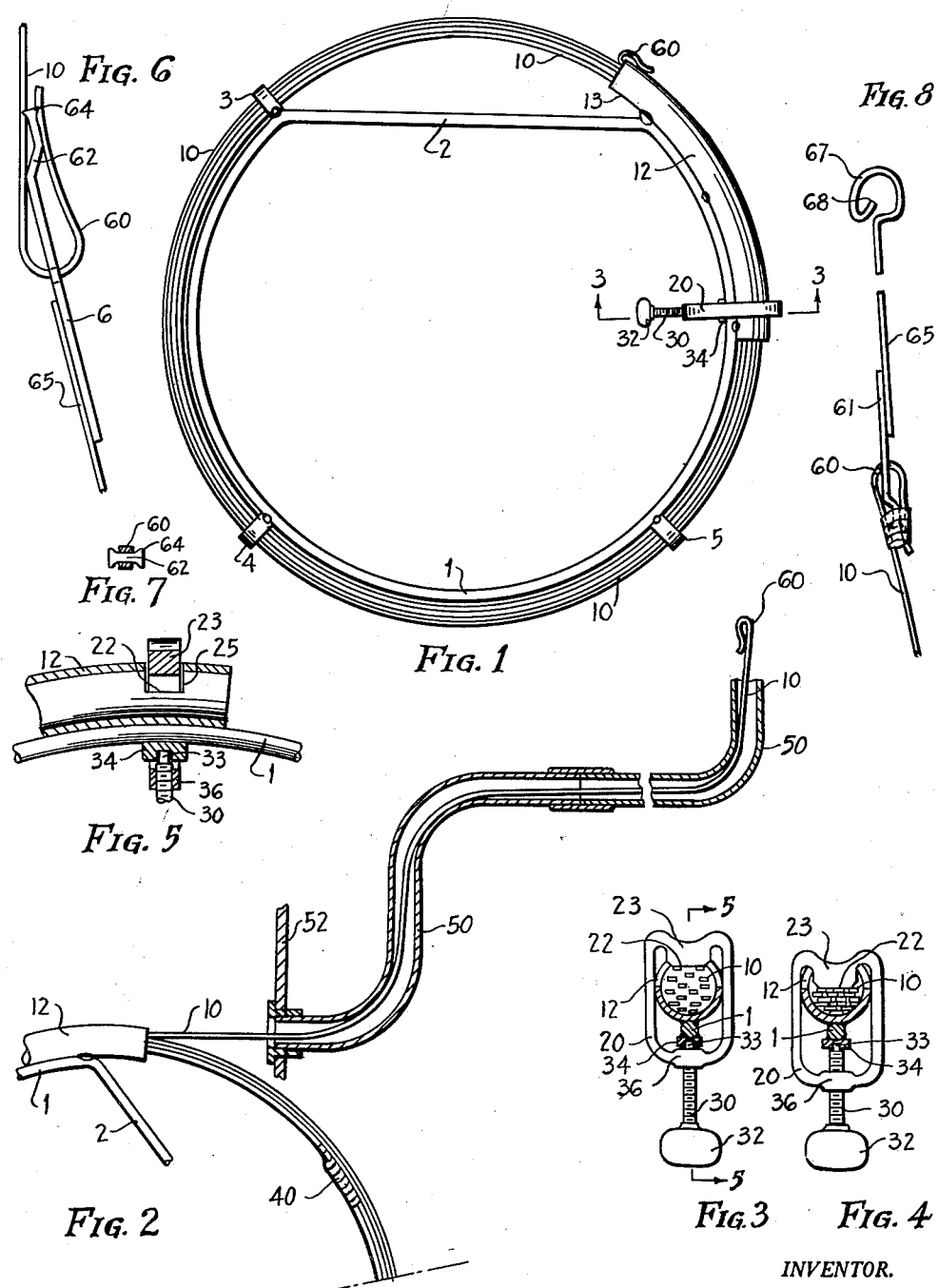

2,600,722

UNITED STATES PATENT OFFICE 2,600,722

MEASURING FISH WIRE REEL

Earl B. Atkinson, Bay Village, Ohio

Application September 22, 1949, Serial No. 117,158

4 Claims. (Cl. 175—376)

This invention relates to a carrier and reel for steel tapes, such as are used by electricians, wiremen and others, and which are commonly known as fishing tapes or fishing wires.

Such tape is usually made of spring steel in the form of a narrow strip of flat wire and which by reason of its resiliency is difficult to handle without a suitable holder or reel.

Heretofore it has been customary to pass the wire in a number of turns through a curved pipe of a length comprising part of a circle, and, in using the tape, the wire is slipped around in such holder. In feeding or thrusting the fishing wire into conduits, it is sometimes necessary to apply considerable force. It is also desirable to be able by some means to estimate or reasonably accurately measure the extent or distance to which the wire has been fed into the conduit.

Objects of my invention are, therefore, to provide a simple, efficient holder or reel which may be cheaply manufactured, convenient in use, suitable for carrying a large number of turns, and correspondingly considerable length of wire.

A further object of the invention is to provide for measuring partial turns with reasonable accuracy.

Another important object is to provide a clamping means by which the remaining turns in the reel may be firmly clamped while pushing forwardly on the tape to pass it through a conduit, or while pulling on the tape to draw electrical wire therethrough.

More specifically, an object is to provide such a clamping means which may be quickly rendered active to hold the wire fixed in the reel. Likewise, the clamp may be readily released to free the wire for turning in the reel. Such clamping means should not constitute a drag or resistance upon turning the wire in the reel when it is desired to have the wire free, and further it should be so arranged as not to encumber the reel, interfering with convenient handling thereof.

Another object is to provide a convenient means for starting the winding of the turns of the wire into the annularly arranged wire holding guides of the reel.

Other objects will become apparent from the following description which relates to the accompanying drawings, in which:

Fig. 1 is a side elevation of my measuring reel;

Fig. 2 is a fragmentary sectional view of a conduit installation, illustrating the mode of use of my invention;

Fig. 3 is a transverse section taken on a plane indicated by the line 3—3 of Fig. 1;

Fig. 4 is a similar view showing the clamp in gripping position;

Fig. 5 is a fragmentary section taken on a plane indicated by the line 5—5 of Fig. 3, showing the position of the clamp on the reel with the wire omitted;

Fig. 6 is a detail of the connection between the tape and a leader or guide attachment;

Fig. 7 is a transverse section through the part shown in the upper portion of Fig. 6;

Fig. 8 is a detail showing a pilot or leader section affixed to the tape ready for use;

Fig. 9 is a perspective on a slightly enlarged scale of the forward end of the leader or guide member;

Fig. 10 is a side elevation similar to Fig. 1 showing my reel at the start of winding the fishing tape thereon and showing a modified form of tape holding or locking means;

Fig. 11 is a view of the upper right hand portion of the reel as shown in Fig. 10, showing it in the loaded or filled condition;

Fig. 12 is a view of the same parts showing the action of the holding or locking means;

Fig. 13 is a transverse section on an enlarged scale taken on a radial plane through the locking means;

Fig. 14 is a perspective detail showing a clip or socket for attaching the end of the fishing tape to a guide ring in the reel;

Fig. 15 is a section taken longitudinally of the holding device shown in Fig. 14;

Figs. 16 and 17 are transverse sections taken on planes indicated by the lines 16—16 and 17—17 of Fig. 15.

Referring to the drawings by the use of reference numerals, my reel comprises essentially an annular frame 1 formed of stiff rod or wire of suitable size to form a rigid frame. As shown, it is circular except for a transverse chord 2, which extends across slightly more than a fifth of the circle. A plurality of holding and guide loops 3, 4 and 5 are affixed to the frame member 1 and spaced approximately as shown. These loops are rigid and circular and may be attached as by welding to the rod, and the fishing tape 10 may be threaded through these rings in the desired number of circular turns, as shown. A curved tubular segment 12 is similarly secured to a portion of the ring, preferably projecting beyond the chord 2, as at 13, and serves as a hand-gripping portion and a further guide and container for the turns of the tape.

Assuming that the circle of the tape threaded through the members 3, 4, 5 and 12 is approximately five feet in circumference, it will be noted that the space between the end 13 of the member 12 and the guide member 3, will be about one foot. Thus, as the tape is turned or slipped into its coiled position in the reel, it may be moved by grasping the tape at this space and opposite the chord 2. As the turns of the tape are fed outwardly from the reel, this grasping space affords a similar measuring means. Thus, by noting the position at the inner end of the tape, the remaining turns may be counted, and the length of a remaining partial turn may be estimated.

By gripping the curved tubular segment 12 with one hand, the coils or turns of the tape may be grasped adjacent the ends 13, and as the hand moving the tape passes over to the ring 3, one foot of tape may be thus measured or reasonably accurately estimated. Thus the reel may be conveniently held in one hand while feeding the tape forwardly with the other and in measured amounts.

The right hand end of the chord 2 being attached inside of and below the end of the pipe 12 affords the finger space facilitating the gripping of the coils adjacent the end for this feeding and measuring motion.

For exerting a strong push or pull on the tape, it is desirable to clamp it tightly to the reel to avoid slipping and to most effectively use the reel as a pushing and pulling implement. Such a clamping device which will permit free sliding of the tape, and which may be quickly rendered effective, comprises a looped member 20 having inwardly projecting clamping face 22 which is formed on a tongue or projection 23 fitted into a transverse slot 25 in the pipe segment 12. This slot prevents circumferential movement or tipping of the clamp loop while permitting its free inward and outward radial movement. Any suitable means may be used for drawing the clamp inwardly from its idle position in Fig. 4. As shown, I have provided a thumb screw 30 having a suitable wing head 32 and a reduced inner end 33 fitted into the guide 34 welded or otherwise secured to the ring 1. The first turn of the wire may be fastened to the next turn by welding, taping or otherwise, as indicated at 40, thus forming a holding ring. This also affords a marker for judging the partial turn.

The conduit shown in Fig. 2 is indicated as a suitable electric wire conduit 50 leading from a wall surface of any kind indicated at 52 and as having the usual corners or joints through which the tape passes, as shown.

The end of the tape is provided with a hook or loop portion 60, to which may be secured a lead or pilot member. The loop 60 may itself constitute the leading and guiding end. Also it affords a latch engaging the end of the pipe segment 12 when the reel is not in use.

When a pilot or leader is used to facilitate passing the forward end of the fishing tape through a conduit, I provide a convenient method of attaching such a leader or pilot section which utilizes the hooked end 60 of the tape.

As shown in Figs. 6, 7 and 8 a short section slightly thicker than the tape indicated at 51 may be welded or riveted, or both, to one end of a flexible strip 65, and may be provided with an intermediate opening or slot receiving the hooked portion 60, while at its end (upper end in Fig. 6) it may be offset as at 62 and have its end offset at one or both sides, as indicated at 64, to engage the tape and hooked end as shown particularly in Figs. 6 and 7 to aid in maintaining alignment.

As is customary and for effective use after the parts are connected, as shown in Fig. 6, they may be wrapped with tape as indicated at 63 in Fig. 8.

The forward end of such a leader or pilot member 65 may be suitably formed to facilitate passage through the conduit across fitting offsets or shoulders, and around corners and the like. To assure easy passage in either direction I prefer to form the head, as shown in Figs. 8 and 9, in the nature of a loop 67, while the end of the strip 65 is turned inwardly as indicated at 68.

It is well known that flat wire suitable for fishing tape purposes is very difficult to handle inasmuch as it is preferably flat strong spring steel. Loading the reel, that is, winding the fishing wire onto the reel, the inner end of the wire is threaded through the guide members of the reel for one turn, and then is taped or otherwise conveniently secured at its end to the first turn, as indicated at 40 in Fig. 2 or 71 in Fig. 10.

Another method of leading the wire onto the reel will be described in connection with the modified form shown in Fig. 10, et seq.

Having completed the first turn and secured it to the wire at the completion of the loop thus formed on the reel, the wire or tape may be wound onto the reel by sliding the tape into the guide member 12 for the desired number of turns until the hooked end 60 reaches the position shown in Fig. 1. The reel may now be handled and transported at will. The clamping device may be tightened somewhat to avoid looseness while handling.

When it is desired to use the reel, the end may be thrust into a conduit 50 which for purposes of illustration is indicated as attached to the wall 52 of an outlet box or the like, and which likewise illustrates turns and connections of such conduit.

The hooked end acts as a guide turning corners and passing obstructions such as the edges of joints in the well known manner until the loop 60 of the fishing wire has reached the opposite end of the conduit and is there exposed. Now the end of an electric wire may be secured to the loop, and by pulling on the reel may be withdrawn from the conduit to pull the electric wire therethrough. After each pulling motion the reel may be turned to take up or rewind the fishing wire into the reel.

During the pushing of the wire into and through the conduit, resistance is sometimes considerable, and one of the essential features of my invention is to enable the use of the reel as an effective pushing handle, and likewise for pulling, as the case may be, is the effective locking of the turns in the reel against rotation with relation to the reel. Thus, if the wire is affording severe resistance, a portion of it is pulled from the reel as the coils turn therein, and then by a simple turn of the thumb screw 32 the clamp 20 is brought to the tightened position illustrated in Fig. 4. The turns of the wire in the reel are thus tightly held and the entire reel may be used as a pushing implement with both hands of the operator effectively grasping the same.

Thus, the wire may be thrust into the conduit without likelihood of buckling it, by reason of the fact that the reel affords an excellent handle for guiding it while exerting the maximum pressure.

As indicated, another important advantage of this reel construction is that it may be used as a measuring device to determine the distance which the fishing wire has passed into or through the conduit. It is desirable to know how much electric wire will be required to traverse the conduit, and a convenient method is to determine the amount of fishing wire unreeled when the leading end emerges from the conduit 50.

By making the reel of a size such that the turns of the tape thereon are approximately five feet in circumference, it will be seen that with the length of the tape known the amount of wire or tape unreeled may be readily approximately determined by counting the turns remaining on the reel. This would indicate in multiples of five feet the remaining amount of wire plus any partial turn. The partial turns may be determined in feet and estimated fractions thereof, by observing the location of the end marker, the spacing between the guides 3, 4 and 5 being approximately fifteen inches and the distance across the chord 2 of the frame being about the same. The fishing wire may be reeled or unreeled by gripping the coils above this chord and a movement of approximately one foot by a convenient motion, allowing room for the hand to move and stop above the chord.

There are circumstances when it is desired to use a pilot or leader of greater flexibility than the fishing wire itself, in which case the leader 65 may be quickly attached as described, and, here again, its length being known, it needs only to be included in the computation to determine the amount of fishing wire in the conduit, and the location of the inner end of the leader and likewise the total distance from the hooked end 67 to the wall plate 52.

For still further convenient loading of the reel and of handling the first turn, I may provide a ring 70 of wire the same size or slightly larger than the contemplated fishing wire, thus affording some additional stiffness. This ring may have its ends secured together forming a smooth solid ring, and is preferably of such a size that it will lie close to the frame 1 at the inner portions of the guide and handle members. The end of the fishing wire may be taped to this ring 70 and the loading of the reel may be facilitated, needing only to be slid through the guide 12 thereafter, until the required number of turns are wound into the reel.

Instead of taping as at 71 to hold the end of the fishing wire 10 to this floating ring 70, I may provide on the ring 70 a fastening device in the form of a pocket or slot adapted to receive the end of the wire 10 and tightly embrace the same, as shown in Figs. 14 to 16. A thin metal band, say, of an inch or more in length, is secured to the ring and looped around the same, having a portion 80 secured to the underside, its edges meeting and its intermediate portion being looped outside of the ring 70, and formed to provide a narrow receptacle fitting the end of the wire 10. As shown, the portion 81 of this retainer member is wide enough to receive a fishing wire tape of the same width as the ring 70 for a portion of its distance, the remaining portion of the length of the retainer being narrowed as at 82 to receive narrower tape 10 as shown in Figs. 14 to 16. Fig. 17 shows a wider tape 10a in the retainer. The material of which this tape or retainer is formed is sufficiently thin to avoid catching upon the guiding members of the reel.

In Figs. 10 to 13 I have shown another construction by which I may clamp one turn of the fishing wire instead of gripping all the remaining turns as by the clamp 20 heretofore described. This construction is somewhat simplified and has been found practical in use, and as shown the guiding handle portion 12a has a transverse bridge formed by cutting a transverse slot near one end of the tube, and then bending the portion 75 inwardly sufficiently to allow the fishing wire to pass above or outside of the same, as appears in Fig. 12 and 13. Outside of this bridge member 75 I may mount a rigid threaded block 76 through which may pass a thumb screw 77 adapted to meet and press against one turn of the fishing wire 10 as shown.

In the use of this clamping device the inner end of the fishing wire is first passed through the slot or opening above the bridge 75 and is then secured to its first turn or to the guide ring 70, as by the taping at 71, or by the end retaining clip, shown in Fig. 14. The continued thrusting on the wire 10 will turn the ring 70 and pass the successive turns continuously through the space above the bridge 75. Whenever it is desired to clamp the fishing wire to the reel a simple partial turn on the locking screw 77 will securely hold the outermost turn remaining on the reel either for pushing or pulling purposes.

Having thus described my invention what I claim is:

1. A reel for spring steel fishing wire comprising a single rigid rod formed into a circular portion and a straight chord section of a length of approximately one-quarter of the annulus, a plurality of rigid loops fixed to the rod annulus at evenly spaced points, one of the loops being at the end of the chord and another diametrically opposite the same, and still another equally spaced between the last-mentioned loops, an arcuate tubular handle section concentric with the rod annulus and having one end adjacent the other end of the chord portion of the frame, said loops and handle being preferably of the same transverse diameter and all being adapted to receive the turns of the fishing wire reel, the handle portion having a rigid bridge at its outer face spaced inwardly from the inside surface and through which the wire is threaded, and a clamping means adapted to engage the wire and press it inwardly toward said bridge.

2. A reel for metallic tape for the use described, comprising a frame formed of a rigid rod-like annular structure, separate annular guide members located at spaced distances and rigidly carried by the frame and adapted to transversely surround the fishing wire when it is in substantially circular coils about the frame, one of the guide members comprising a section of a tube curved to conform to the coils and to the frame, and of sufficient length to form a handle, said frame having a chord-like portion spaced from the turns of the fishing wire whereby the turns may be grasped between the guide members for rotating the circular coils within the reel in measured step by step motion.

3. The fishing wire reel described in claim 2 in which the handle-gripping portion is provided with a transverse bridge within its exterior contour, and over which one turn of the metallic tape may pass, and including means for clamping the wire against the bridge.

4. The reel described in claim 2 including in addition to the circular coils of the metallic tape a solid closed ring fitted around the frame and within the guides and adapted to be turned therein, and including means for attaching one end of the tape to said solid ring whereby the metallic tape may be guided into and coiled in said guides, said attaching means comprising a metallic pocket of thin rigid metal secured to and extending circumferentially of said solid ring, and being adapted to receive and fit tightly over a short section of the inner end of the first coil of the metallic tape.

EARL B. ATKINSON.

REFERENCES CITED

The following references are of record in the file of this patent:

UNITED STATES PATENTS

| Number | Name | Date |
|---|---|---|
| 1,107,250 | Bigham | Aug. 18, 1914 |
| 1,118,270 | Dahl | Nov. 24, 1914 |
| 1,761,592 | Seidel | June 3, 1930 |
| 1,815,433 | Dunagan | July 21, 1931 |
| 1,890,945 | Hormel | Dec. 13, 1932 |
| 1,956,806 | Mitzen | May 1, 1934 |